May 19, 1936.　　　L. KASSLER　　　2,041,134
SPEED MEASURING APPARATUS
Filed March 7, 1935
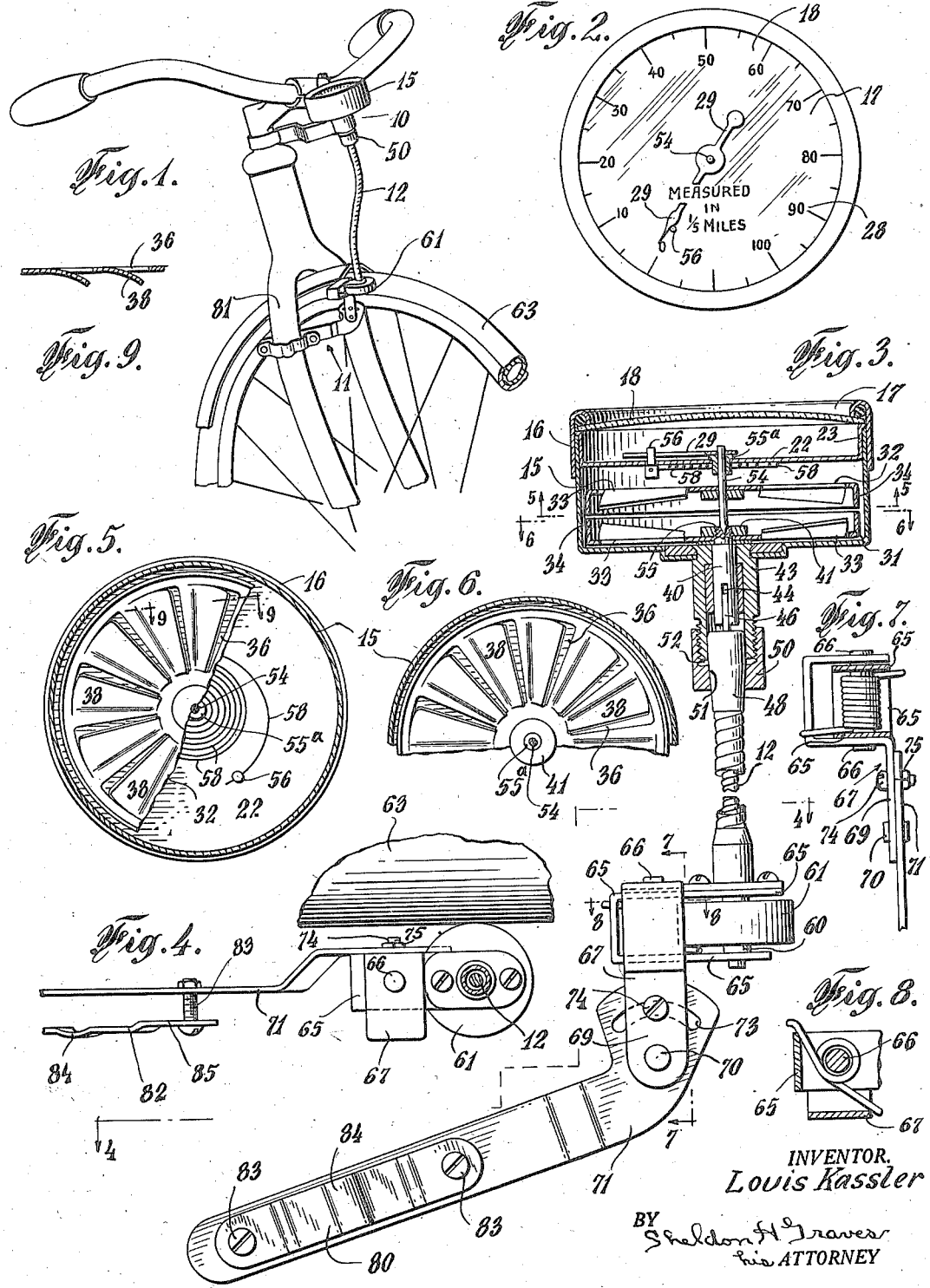
INVENTOR.
Louis Kassler
BY Sheldon H. Graves
his ATTORNEY Patented May 19, 1936

2,041,134

UNITED STATES PATENT OFFICE 2,041,134

SPEED MEASURING APPARATUS

Louis Kassler, New York, N. Y., assignor to Jeanette S. Kassler, New York, N. Y.

Application March 7, 1935, Serial No. 9,711

2 Claims. (Cl. 74—13)

This invention relates to speed measuring apparatus and more particularly to a toy speedometer which may be used, for example, on a child's bicycle and which at the same time will indicate speed with reasonable accuracy.

In another and broader aspect of my invention, the same comprises a novel method and means for actuating the speedometer from a road wheel of the bicycle or other vehicle. In accordance with the present invention the speedometer is driven from the periphery of the wheel by a friction roller in contact with the wheel tire which in the present form of invention is adjustably supported from the steering fork of the bicycle and the invention also contemplates a special adjustable support for such roller. The speedometer which is secured to the steering post of the cycle at or near the handle bars and preferably in front thereof is movable with the handle bars and is thus visible at all times and I preferably connect the speedometer with the friction roller by means of a flexible shafting so that lateral vibrations of the roller, due to wobbling of the steering wheel or due to accumulated dirt on the tire or rim of the wheel are not transmitted to the speedometer. My invention further contemplates a novel supporting means for the friction roller which permits adjustment of the roller to form proper driving contact with the tire. With the device constructed as described, identical measuring devices may be supplied to cycles of widely different types and dimensions.

A further object of my invention is to provide an improved pneumatic or air operated speedometer as will be more fully pointed out hereinafter.

Other objects of my invention include simplicity and economy of construction, efficiency and accuracy of operation and dependability in use.

Other objects and advantages of my invention will appear from the following description taken in connection with the accompanying drawing, wherein:

Figure 1 is a fragmentary perspective view of a bicycle showing handlebars, front wheel and front wheel fork, with one form of my improved speedometer and driving means applied thereto;

Figure 2 is a top plan view of the speedometer proper showing the dial and indicating pointer;

Figure 3 is a longitudinal vertical sectional view through the speedometer and showing the operating means therefor in elevation together with a flexible shaft connecting the operating means with the speedometer;

Figure 4 is a horizontal sectional view taken on the line 4—4 of Figure 3;

Figure 5 is a sectional view partly in elevation taken on the line 5—5 of Figure 3 looking in the direction of the arrow;

Figure 6 is a view similar to Figure 5 but taken on the line 6—6 of Figure 3 looking in the opposite direction;

Figure 7 is a section taken on the line 7—7 of Figure 3;

Figure 8 is a detail sectional view taken on the line 8—8 of Figure 3; and

Figure 9 is a detail sectional view of one of the speedometer impellers, this view being taken on the line 9—9 of Figure 5.

Referring more particularly to Figure 1, my speed measuring device comprises a speedometer 10 which is shown as clamped to the steering pillar of a bicycle, a driving device 11 clamped to one prong of the fork of the bicycle and a flexible shaft 12 connecting the driving device with the speedometer.

The speedometer as shown more particularly in Figures 3, 5 and 6 comprises a casing 15 at the top of which is a cover 16 having an opening 17 closed by a glass disc 18.

Supported in the casing 15 is a dial plate or member 22 formed with an outer flange 23 which extends outwardly and is curved over the edge of the casing 15 and fits between this edge and the glass disc 18.

The outer face of the dial 22 is marked with such indicia 28 and over this dial is adapted to rotate an arrow or pointer 29. The indicia in the case of a speedometer for a child's bicycle preferably represent fractions of a mile per hour such as fifths of a mile. On the scale shown, if the child was propelling the bicycle at ten miles an hour, the speedometer would indicate fifty and if the child were able to attain a speed of twenty miles an hour, the speedometer would indicate one hundred.

Located in the casing between the dial plate and the bottom of the casing are two independently rotatable fan elements or impellers 31 and 32. These impellers may, if desired, be of identical construction and comprise plates or discs 33 having outer flanges 34. The material of the plates 33 is cut radially at 36 in the manner indicated in Figures 5 and 6 and the metal is bent to form inclined blades 38, as shown also, for example, in Figure 9. It will be seen that the impellers are arranged parallel with one another with the free edges of the flanges 34 closely adjacent to one another.

Impeller 31 is secured to a short stub shaft 40 by a screw and nut connection 41 and shaft 40 which passes downward through the bottom of casing 15 and is journaled in a bushing 43. The outer or lower end of the stub shaft 40 is slotted as indicated at 44 for the reception of a tongue 46, projecting upwardly from a short shaft 48 secured to the flexible shaft 12. A gland member 50 has a screw threaded connection with the bushing 43 and is provided with a downwardly tapered opening 51 through which the said shaft 48 extends; this shaft being correspondingly tapered and in this manner secured in the bushing by the gland member 50.

The upper impeller 32 is secured to a shaft 54 journaled at its lower end in a pin bearing 55 in the stub shaft 40 and carries near its opposite end a collar 55a journaled in the dial plate 22. The pointer 29 is secured to the outer end of shaft 54 and a pin 56 secured to the dial plate serves as a stop for the pointer at the zero position. Connected at one end to a lower extension of the pin 56 and at its opposite end to the collar 55a is a spiral spring 58 which normally biases the pointer 29 to zero position.

The lower end of the flexible shaft 12 carries a short shaft 60 upon which is mounted a friction roller 61 which may, if desired, have a rubber facing which in the operation of the device is normally pressed into contact with the tire 63 of the front wheel of the bicycle. Shaft 60 is journaled in a yoke 65 which in turn is pivotally mounted on shaft 66 carried by the member 67. As will be seen from Figure 7, member 67 is formed to embrace the yoke 65 and surrounding the shaft 66 is a helical spring, one end of which bears against the member 67 and the other end against the yoke 65, thus exerting the required force for pressing the roller 61 into contact with the tire 63.

Member 67 is formed with an extension 69 pivotally mounted at 70 in the outer end of a bracket 71. The bracket 71 is formed with a slot 73 through which passes a bolt 74 having a nut 75, the bolt extending through the extension 69 of the member 67. Slot 73 is concentric with the pivotal point 70 of the member 67 so that on loosening the bolt 74 the member 67, yoke 65 and the roller carried thereby may be swung in a plane parallel to the plane of the wheel in the bicycle. This is for the purpose of adjusting the wheel 61 to a plane substantially tangential to the rim of the bicycle wheel to secure the proper traction, its adjusted position being dependent on the diameter of the bicycle wheel.

Bracket or bar 71 is secured by means of a clamp 80 to one prong 81 of the front fork of the bicycle. For this purpose I provide a clamping plate 82 secured by means of bolts 83 to the bracket 71. For the purpose of tightly clamping the bracket 71 to the fork and holding the parts carried by the bracket in fixed position, I find that for the usual bicycle forks, a plate 82 of the form shown in Figure 4 is satisfactory. It will be seen that this plate has a central outwardly curved portion 84 and also an inwardly offset portion 85 where the plate is engaged by the bolts 83.

As may be readily seen, many of the parts, such as the brackets, yoke, as well as the casing and parts contained therein, including the impellers, may be easily and economically made of stamped metal.

While in the embodiment of the invention shown in the drawing, the friction roller 61 is mounted in contact with the side of the bicycle tire or rim, it is obvious, if desired, this roller may be mounted to engage the tire tread and be pressed against the tire in the plane of the bicycle wheel instead of at right angles thereto. As will be seen from Figure 1, the bracket 71 is of sufficient length to extend beyond the mudguard shown in that figure.

Having now described my invention what I claim and desire to secure by Letters Patent is:—

1. In a driving device for speedometers adapted to be actuated from the tire of a cycle, a bracket comprising a bar secured to the frame of the cycle, a member of flat metal pivotally secured flat against said bar, said member being formed beyond said bar with a U-shaped extension having its sides at approximate right angles of said bar, a pin connecting the sides of the U-shaped extension, a U-shaped member of flat material pivotally mounted on said pin and having its arms extending approximately in the direction of said bar, a friction roller between the arms of said U-shaped member and journaled therein, a spring supported by said pin and having one end bearing on said U-shaped member and the other end bearing on said extension, said spring urging said roller against said tire.

2. In a driving device for speedometers adapted to be actuated from the tire of a cycle, a bracket comprising a flat bar secured to the steering fork of the cycle, a member of flat metal pivotally secured near the outer end of said bar, said member being bent beyond said bar to form a U-shaped extension opening toward the tire with its sides at substantially right angles to the bar, a pin connecting the sides of the U-shaped extension, a flat metal member bent to U-shape and pivotally mounted on said pin, a friction roller journaled between the sides of said last named member, a coil spring surrounding said pin, bearing at one end against said extension and at the other against said U-shaped member thereby pressing said roller against said tire.

LOUIS KASSLER.